April 18, 1961 H. L. E. M. BONGRAIN ET AL 2,980,799
RADIATION METER INCORPORATING A RADIOACTIVE ELEMENT
Filed Jan. 24, 1956
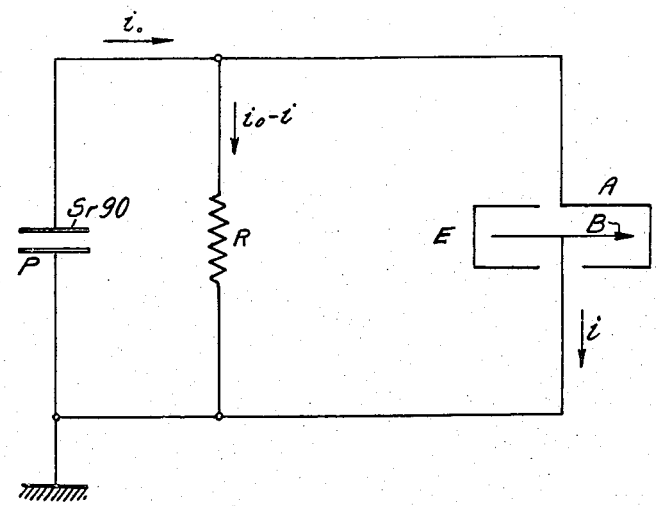
INVENTORS:
HERVÉ LOUIS EUGÈNE MARIE BONGRAIN
MICHEL ALBERT AGON
By
Richardson, David and Nardon
ATTY'S.

United States Patent Office 2,980,799
Patented Apr. 18, 1961

2,980,799
RADIATION METER INCORPORATING A RADIOACTIVE ELEMENT

Hervé Louis Eugène Marie Bongrain, 20 Rue Lafayette, Versailles, and Michel Albert Agon, 5 Bis Rue Agar, Paris, France Filed Jan. 24, 1956, Ser. No. 561,050

Claims priority, application France Feb. 9, 1955

2 Claims. (Cl. 250—83.6)

Our invention has for its object a radiation flowmeter of the type associated with a voltage supply constituted by a radioactive element.

Among the prior detecting apparatus adapted to detect the presence of radiations produced by radioactive substances, we may refer to flowmeters measuring the instantaneous irradiation at any moment so that any necessary immediate protective steps may be taken at once.

The apparatus used hitherto are of a comparatively intricate structure and require in particular a high voltage feed through a battery, a vibrator or a magneto-machine. They are bulky and heavy and liable to frequent failure by reason of the wear of the batteries and tubes and they can be used in practice only by skilled operators.

Our invention has for its object to remove these drawbacks and to allow executing a simple small-bulk flowmeter, the life of which is substantially unlimited without any external feeding being required while it may be used by even unskilled persons.

Our invention consists in associating the following parts:

A voltage supply of a small output incorporating a radioactive substance.
A high resistance.
An ionizing chamber of a reduced volume.
An electrometer for measuring the voltage across the terminals of said chamber.

Obviously, it is possible without widening the scope of the invention as defined in the accompanying claims to modify the structural details of the different parts, the material used therefor, and in particular it is possible to modify the type of supply and of electrometer incorporated into the arrangement.

We will now describe the apparatus with further detail, reference being made to the single diagrammatic figure of accompanying drawing. As illustrated in said drawing, we insert in parallel:

A voltage supply P having a small output and constituted by a condenser made of polystyrene associated with armatures one of which is constituted by an alloy containing strontium 90 which emits beta particles.

A high resistance R constituted in the present case merely by the leak resistances of the supply P and of the electrometer E.

The electrometer E of the homostatic quadrantic type carrying a scale of Roentgens per hour. The ionizing chamber is constituted simply by the volume of air enclosed between the armatures A of the electrometer on the one hand and by its revoluble hand B and casing on the other hand.

The operation of the arrangement is as follows:

In the absence of any radiation, no current passes through the electrometer forming an ionizing chamber. The voltage across its terminals is therefore equal to $Ri_0$, $i_0$ being the constant current intensity produced by the supply P and passing entirely through the resistance R. The hand B registers then with the zero of the scale.

In the presence of a radiation, the air in the chamber E is ionized and there passes a current which is proportional to the amount of irradiation. The current passing through the resistance R is reduced then to $i_0-i$ and consequently the voltage across the terminals of the electrometer drops down to $R(i_0-i)$. The hand B is deflected through an amount proportional to the reduction in the voltage $Ri$ and consequently to the amount of irradiation. The latter is read directly on the dial in Roentgens per hour.

The data relating to the arrangement may be selected as follows:

Assuming the source contains 20 millicuries of strontium 90 producing a current of $4.5.10^{-11}$A the voltage across the terminals of a resistance R equal to $10^{13}$ Ω will be equal to 460 volts.

The volume of the ionizing chamber being assumed to be equal to 30 cubic centimeters, an irradiation of 3.6 $R/h$ produces a current of $10^{-11}$ A in said chamber and consequently a drop in voltage of 100 volts across the terminals of the chamber.

The electrometer used carries a scale of 15 subdivisions corresponding to 450 volts and consequently 1 Roentgen per hour corresponds substantially to one subdivision and it is an easy matter to estimate the breadth of one third of a subdivision.

The time constant of the arrangement is equal to CR, C being the sum of the capacities of the supply P and of the electrometer E, R the abovementioned resistance. Said capacities are estimated to be equal altogether to 20 picofarads so that the time constant is equal to about 4 minutes, which is not objectionable for comparatively slow modifications in the rate of irradiation. It may be reduced as a matter of fact by reducing the capacity of the supply.

Of course, the diagram described is applicable for measuring radiations other than ionizing radiations such as light radiations, in which case the ionizing chamber is replaced by a photocell for instance.

What we claim is:

1. A radiation metering system, comprising in combination a supply of voltage incorporating a radioactive element, a resistance fed by said supply, an electrometer fed by said supply in parallel relationship with the resistance and including a casing forming an ionizing chamber, a stationary armature and a revoluble hand carried inside the casing, said armature and hand being separated by a gap and being connected respectively with the opposite terminals of the resistance and adapted to feed across the gap between them a current proportional to the ionization of the chamber to make the hand rock correspondingly, and a scale of Roentgens associated with the revoluble hand and forming an indicator of ionization.

2. A radiation metering system, comprising a supply of voltage incorporating a radioactive element, a resistance, a circuit permanently connecting said resistance with said supply, an electrometer including a stationary case-shaped armature and a revoluble hand carried inside the armature, said armature and hand being connected respectively with the opposite terminals of the resistance to form a shunt path across said terminals upon ionization of the air inside the electrometer armature between the latter and the hand, and a scale of ionization carried by the revoluble hand to move therewith under control of the current passing through said shunt path in accordance with the varying ionization inside the electrometer armature.

(References on following page)

References Cited in the file of this patent

UNITED STATES PATENTS

| | | |
|---|---|---|
| 2,610,302 | Christian | Sept. 9, 1952 |
| 2,668,245 | Rich | Feb. 2, 1954 |
| 2,676,270 | Lahti | Apr. 20, 1954 |
| 2,696,564 | Ohmart | Dec. 7, 1954 |

OTHER REFERENCES

A New Electronic Battery, from the Electrician, vol. 10, page 497, October 31, 1924.

Radioactive Charging Effect With a Dielectric Medium, by Rappapart et al., Journal of Applied Physics, vol. 24, No. 9, pages 1110–1114, September 1953.

Radioisotopic High Potential Low Current Sources, by Coleman, Nucleonics, vol. 11, page 42 to end of article, 1953.

International Conference on the Peaceful Uses of Atomic Energy, vol. 15, pp. 283–290, and 310–316, papers presented in August 1955, printed by United Nations, New York, 1956.